United States Patent
Humphreys

(10) Patent No.: US 6,540,262 B1
(45) Date of Patent: Apr. 1, 2003

(54) FERRULE-FREE HOSE FITTINGS

(76) Inventor: James W. Humphreys, 9454 N. Montgomery Blvd., Pentwater, MI (US) 49449

( * ) Notice: Subject to any disclaimer, the term of this patent is extended or adjusted under 35 U.S.C. 154(b) by 0 days.

(21) Appl. No.: 09/480,040

(22) Filed: Jan. 10, 2000

(51) Int. Cl.[7] .................................. F16L 33/00
(52) U.S. Cl. ......................... 285/256; 385/259
(58) Field of Search ................ 285/256, 259, 285/238

(56) References Cited

U.S. PATENT DOCUMENTS

| | | |
|---|---|---|
| 1,092,673 A | 4/1914 | Stephens |
| 2,099,335 A | 11/1937 | Hansen |
| 2,344,740 A | 3/1944 | Shaff |
| 2,377,812 A | 6/1945 | Scheiwer |
| 3,549,180 A * | 12/1970 | MacWilliam ............ 285/256 |
| 3,791,680 A * | 2/1974 | Cleare ................. 285/256 |
| 4,143,853 A | 3/1979 | Abramson |
| 4,167,204 A | 9/1979 | Zeyra |
| 4,564,132 A | 1/1986 | Lloyd-Davies |
| 4,683,916 A | 8/1987 | Raines |
| 4,712,583 A | 12/1987 | Pelmulder et al. |
| 4,915,351 A | 4/1990 | Hoffman |
| 5,199,752 A * | 4/1993 | Sanders et al. .......... 285/259 |
| 5,398,977 A * | 3/1995 | Berger et al. ........... 285/256 |
| 5,622,393 A * | 4/1997 | Elbich et al. ........... 285/259 |

FOREIGN PATENT DOCUMENTS

| | | | | |
|---|---|---|---|---|
| GB | 2205372 A | * | 12/1988 | ............ 285/256 |
| IT | 636557 | | 7/1965 | |

* cited by examiner

Primary Examiner—Lynne H. Browne
Assistant Examiner—Aaron M Dunwoody
(74) Attorney, Agent, or Firm—Price, Heneveld, Cooper, DeWitt & Litton

(57) ABSTRACT

A garden hose fitting comprising an axially elongated cylindrical body having a first axial end, a second axial end, one of (1) an externally threaded male hose connector, and (2) an internally threaded female hose connector adjacent the first axial end, and interior annular hose-grip ridges adjacent the second end, an annular shoulder projecting radially inwardly of the body intermediate its ends, and an axially elongated support sleeve having an annular collar tightly fitted onto said annular shoulder, extending axially toward the second body end, and spaced radially inwardly of the body to form a cylindrical, hose-receiving and retaining cavity between the ridges and the sleeve.

2 Claims, 2 Drawing Sheets

US 6,540,262 B1

FERRULE-FREE HOSE FITTINGS

BACKGROUND OF THE INVENTION

This invention relates to a garden hose fitting, and particularly to hose fittings having no need for the typical hose ferrule.

Standard garden hoses have a male fitting on one end and a female fitting on the opposite end. Each such fitting is typically attached to the end of the hose using an exterior elongated ferrule, usually of metal, which is crimped down around the hose as an added piece, to secure and stabilize the fitting connections. The added ferrule requires a separate assembly operation of the separate ferrule piece by separate apparatus. Referring to FIG. 3, the prior art which is represented includes on fitting F an axially elongated, external metal ferrule F' mounted onto the outer periphery of hose H when connected to fitting F.

Aside from the above noted mechanical disadvantage, there is another undesirable characteristic of typical metal hose fittings which is the presence of lead in the fitting. Such fittings present the possibility of lead being leached out into the water flowing through the fittings. This is recognized to be undesirable.

SUMMARY OF THE INVENTION

The present invention achieves a unique hose connection that eliminates the need for the usual ferrule, does not require a separate O-ring seal, eliminates a potential leak path, is stronger than a conventional connector, provides greater torque resistance and greater "pull-off" resistance than other known designs presently in use, permits more rapid assembly, and enables full flow therethrough. The novel fitting has an interior shoulder around which is secured an axially elongated tubular support sleeve spaced radially inwardly of hose engaging ridges in the body of the fitting, to thereby form an annular, hose-receiving cylindrical cavity between the ridges and the sleeve.

The novel fitting employs a lead-free sleeve which is the only element contacted by the water flowing therethrough. Hence, the water cannot leach lead out of the other fitting components.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
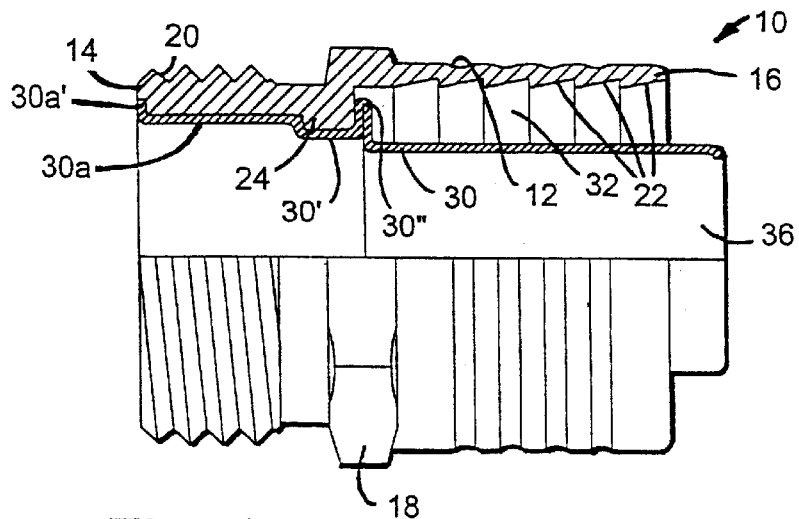
FIG. 1 is a side elevational, partially sectioned view of a male fitting of this invention.
Figure 2:
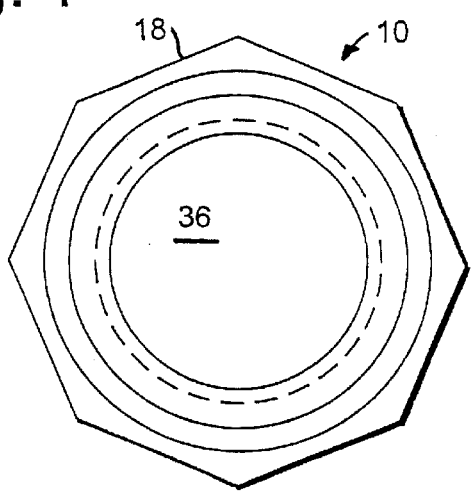
FIG. 2 is an end elevational view of the fitting in FIG. 1.
Figure 3:
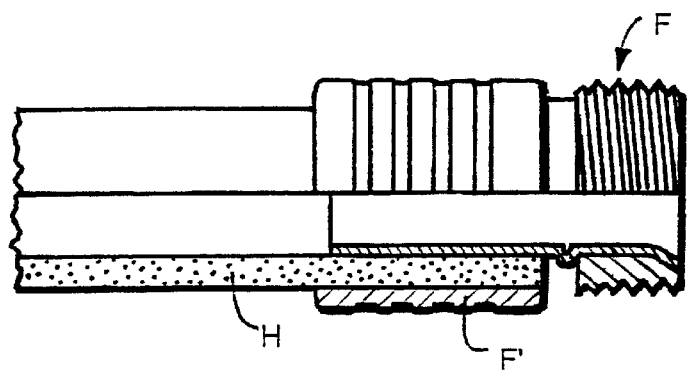
FIG. 3 is a side elevational, partially sectioned view of a prior art fitting.

Referring now to FIGS. 1 and 2, the fitting 1 there depicted comprises a garden hose fitting which includes an axially elongated cylindrical body 12 having a first axial end 14 and a second axial end 16. The body 12 preferably includes a polygonal outer peripheral portion 18 intermediate the ends 14 and 16, an externally threaded male connector 20 adjacent the first end 14, and a plurality of interior, radially peripheral, inwardly projecting annular hose engaging and gripping ridges 22 adjacent second end 16, the plurality of which extend axially inwardly of the body from second end 16. Internally of body 12, intermediate the two ends, is an annular, axially facing shoulder 24 which projects radially inwardly of the body.

An axially elongated support sleeve 30 is inside body 12. The sleeve 30 defines a hollow flow passage almost as large in diameter as the hose itself with which it cooperates, so as to achieve essentially full flow with minimal flow resistance through the fitting passageway 36 thus formed. Sleeve 30 includes an annular collar 30' fitted tightly onto annular shoulder 24 of body 12 as by being crimped onto the two opposite, annular, axially oriented faces of this shoulder 24. The portion of sleeve 30 which extends toward second end 16 includes a doubled over, U-shaped crimp 30" made of one sleeve layer which extends radially outwardly against shoulder 24 and a second sleeve layer which is doubled back radially inwardly on the first layer, and then extends axially in the form of a cylinder toward end 16, preferably at least as far as end 16, and most preferably beyond end 16 as depicted in FIG. 1. This elongated cylindrical sleeve portion is spaced radially inwardly from the ridges 22, defining between the sleeve and these ridges an annular, generally cylindrical cavity 32 which receives the end of a resilient, polymeric, e.g., rubber, garden hose which is force fitted axially between these components. When the fitting is attached to the end of a garden hose, sleeve 30 constitutes an axial and radial support for the hose, as well as cooperating with sharp ridges 22 to retain the fitting on the hose.

In the embodiment depicted in FIGS. 1 and 2, sleeve 30 has a portion 30a which extends axially toward end 14 and is crimped at 30a' around this end 14. Although this added feature is not essential, as will be noted from the following description of the embodiment in FIGS. 4 and 5, the structure does form a complete lining for the hose fitting through which liquid flows, as well as giving added stability to this end of the sleeve.

Figure 4:
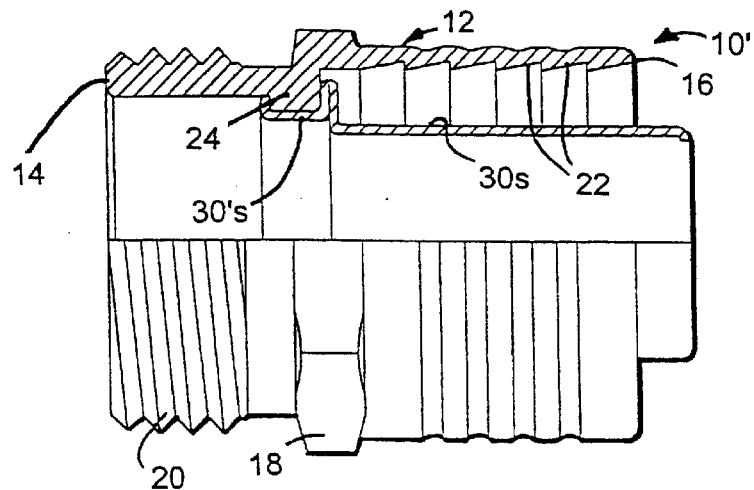
FIG. 4 is a side elevational, partially sectioned view of an alternative embodiment of the male fitting in FIGS. 1 and 2.
Figure 5:
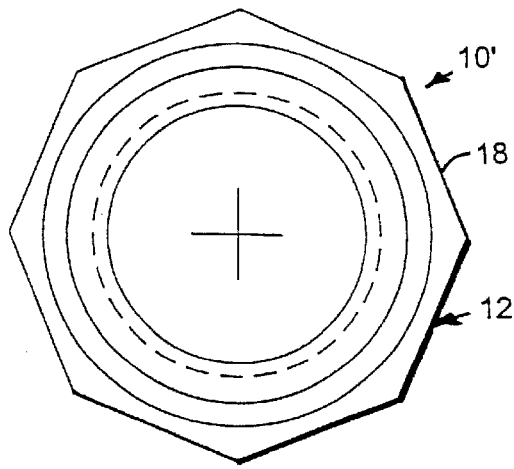
FIG. 5 is an end view of the structure in FIG. 4.

Referring now to FIGS. 4 and 5, the second embodiment 10' of the male fitting as depicted includes body 12, first axial end 14, second axial end 16, polygonal fitting member 18 for rotating the fitting by hand or by wrench, male threads 20, projections 22, and shoulder 24. However, in this embodiment, the sleeve 30S has an annular collar 30'S engaging shoulder 24 on both axial ends thereof, but not having portion 30a or 30a' as in the FIG. 1 embodiment.

Figure 6:
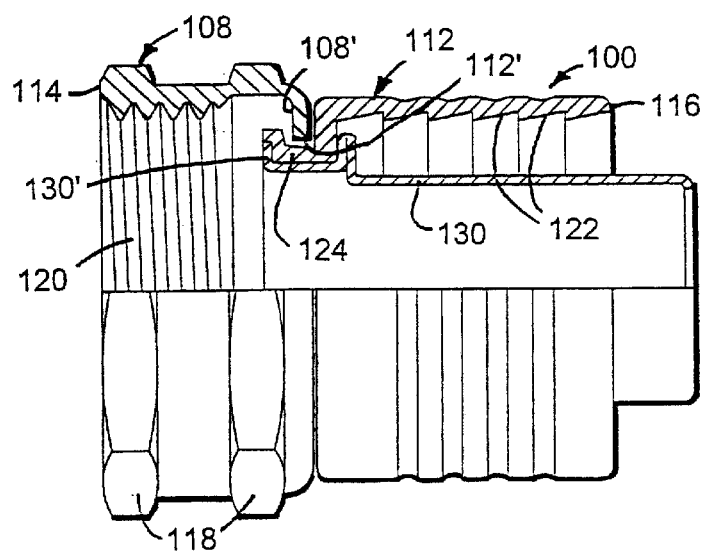
FIG. 6 is a side elevational, partially sectioned view of a female hose fitting according to this invention.

In FIG. 6 is depicted a fitting embodiment 100 which incorporates a female fitting connector rather than the male threaded connector 20. More specifically, body 112 has a second end 116 and also has an interfitted female connector 108 which has an outer axial end 114 forming the second end of the fitting. Connector 108 has internal threads 120 forming part of this female connector, as well as preferably a pair of polygonal outer peripheral portions 118 for actuation of the female connector manually or by wrench. The female connector 108 is attached to the remainder of body 112 by having a radially inwardly extending annular flange 108' fitting into an annular groove 112' on the outer surface of annular radially inwardly projecting shoulder 124. Secured around this shoulder 124 is one end of sleeve 130 as by crimping an annular collar 130 therearound, to form a tight connection. Sleeve 130 extends toward the second end 116 and preferably therebeyond, as depicted in FIG. 6. The sleeve 130 and body 112, and particularly the ridges 122 internally of this body 112, form a cylindrical, axially elongated cavity to receive the end of a polymeric hose. The hose end is to be force fitted into this cavity.

Preferably all of the fittings of this invention are made of metal such as brass, including the body and the sleeve.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A garden hose fitting comprising:

an axially elongated cylindrical body having a first axial end, a second axial end, a polygonal outer peripheral portion between said ends and having adjacent said first axial end an internally threaded female hose connector having an annular radially-inwardly extending flange, and an interior, peripheral plurality of radially inwardly projecting, annular hose-grip ridges extending axially inwardly of said second end;

said body having an annular shoulder projecting radially inwardly of said body intermediate said ends, said shoulder having a radially-outwardly opening groove and said annular flange interfitting into said annular groove; and an axially elongated support sleeve having an annular collar tightly fitted onto said annular shoulder, extending axially toward said second end, and being spaced radially inwardly of said body to form a cylindrical hose-receiving cavity between said plurality of ridges and said sleeve.

2. A garden hose fitting comprising:

an axially elongated cylindrical body having a first axial end and a second axial end having adjacent said first axial end an internally threaded female hose connector having an annular radially-inwardly extending flange, and having interior, peripheral, radially inwardly projecting hose-grip ridges adjacent said second end;

said body having an annular shoulder projecting radially inwardly of said body intermediate said ends, said shoulder having a radially-outwardly opening groove and said annular flange interfitting into said annular groove; and an axially elongated support sleeve having an annular collar tightly fitted onto said annular shoulder, extending axially toward said second end, and being spaced radially inwardly of said body to form a cylindrical, hose-receiving and retaining cavity between said plurality of ridges and said sleeve.

* * * * *

UNITED STATES PATENT AND TRADEMARK OFFICE
CERTIFICATE OF CORRECTION

PATENT NO. : 6,540,262 B1
DATED : April 1, 2003
INVENTOR(S) : James W. Humphreys It is certified that error appears in the above-identified patent and that said Letters Patent is hereby corrected as shown below:

Column 1,
Line 65, "fitting 1" should read -- fitting 10 --;

Column 2,
Line 65, "collar 130" should read -- collar 130' --

Signed and Sealed this

Ninth Day of September, 2003

JAMES E. ROGAN
*Director of the United States Patent and Trademark Office*